United States Patent
Lester et al.

[19]

[11] Patent Number: 6,115,464
[45] Date of Patent: Sep. 5, 2000

[54] METHOD AND SYSTEM FOR DISTINGUISHING VALID DTMF SIGNALS FROM SPURIOUS DTMF NOISE

[75] Inventors: Leland Lester; David Iglehart; Daniel B. Kelly; Tave Pearce Dunn, all of Austin, Tex.

[73] Assignee: Siemens Information and Communication Networks, Inc., Boca Raton, Fla.

[21] Appl. No.: 08/960,409

[22] Filed: Oct. 29, 1997

[51] Int. Cl.⁷ .............................. H04M 3/00; H04M 5/00
[52] U.S. Cl. ......................... 379/283; 379/77; 379/386; 327/39; 327/44
[58] Field of Search ................... 379/283, 386, 379/77, 387, 372, 74, 88.18, 350; 327/39, 42, 44, 45, 47

[56] References Cited

U.S. PATENT DOCUMENTS

| | | | |
|---|---|---|---|
| 4,386,239 | 5/1983 | Chien | 179/84 VF |
| 4,599,495 | 7/1986 | Richards | 179/84 VF |
| 4,868,872 | 9/1989 | Roberts et al. | 379/386 |
| 4,885,763 | 12/1989 | O'Brien et al. | 379/67 |
| 4,979,214 | 12/1990 | Hamilton | 381/46 |
| 5,010,567 | 4/1991 | Tsushima | 379/77 |
| 5,172,406 | 12/1992 | Locke | 379/88.12 |
| 5,375,166 | 12/1994 | Odaohara | 379/97 |
| 5,392,348 | 2/1995 | Park et al. | 379/386 |
| 5,519,764 | 5/1996 | Pierce et al. | 379/67 |
| 5,592,544 | 1/1997 | Murata et al. | 379/283 |
| 5,619,564 | 4/1997 | Canniff et al. | 379/386 |
| 5,638,436 | 6/1997 | Hamilton et al. | 379/351 |
| 5,699,421 | 12/1997 | Nirchberg et al. | 379/386 |
| 5,793,862 | 8/1998 | Sato et al. | 379/386 |
| 5,818,929 | 10/1998 | Yaguchi | 379/418 |

*Primary Examiner*—Curtis A. Kuntz
*Assistant Examiner*—Binh K. Tieu

[57] ABSTRACT

A method and system for distinguishing valid DTMF signals from spurious DTMF noise includes detecting signals having a first signal component indicative of DTMF signals and having a second signal component having frequencies unrelated to DTMF frequencies. The second component is utilized in isolation from the DTMF frequencies of the first signal component. The analysis includes determining a signal level representative of the second signal component. If the signal level exceeds a predetermined threshold level, the first signal component is determined to be spurious noise. On the other hand, if the signal level is below the threshold level, the first signal component is passed to a DTMF-responsive system, such as a voicemail system or a voice response unit. Optionally, the operation includes requesting confirmation of the signal of interest, if the signal level of the second signal component falls within a range which includes the threshold level as its upper limit.

19 Claims, 2 Drawing Sheets

METHOD AND SYSTEM FOR DISTINGUISHING VALID DTMF SIGNALS FROM SPURIOUS DTMF NOISE

BACKGROUND OF THE INVENTION

The invention relates generally to signal detection within a telecommunications network and more specifically to a method and system for distinguishing valid Dual Tone Multifrequency (DTMF) signals from spurious DTMF noise transmitted over a telecommunications line.

DESCRIPTION OF THE RELATED ART

There are twelve standard DTMF signals that are used to allow a person to communicate with a remote electronic device via a telecommunications line. A DTMF signal is generated from a telephone by depressing one of the twelve keys of the keypad (0–9, * and #). The remote electronic device receives the DTMF signal and processes the signal as a code. As an example, the voicemail system of a private branch exchange (PBX) or a central office of a telecommunications network may decode a received DTMF signal as a designation that the caller wishes to record a voicemail message intended for a particular party. As another example, DTMF signals may be used to select options presented in a menu tree of options of a voice response unit.

In addition to the twelve standard signals, there are four DTMF signals that are primarily used within the military phone network. Each of the sixteen signals is a direct algebraic summation of a pair of frequencies. One frequency in the pair is selected from four low frequencies (i.e., 697 Hz, 770 Hz, 852 Hz and 941 Hz), while the other frequency in the pair is selected from a group of higher frequencies (i.e., 1209 Hz, 1336 Hz, 1477 Hz and 1633 Hz). The eight tone frequencies are designed to avoid harmonics. The high frequency tone within a pair should be at least two decibels louder than the low frequency tone. This amplitude relationship is referred to as "twist."

As previously noted, DTMF signaling may be used by a calling party to identify a particular individual for whom a voicemail message is to be left. In addition, DTMF signaling may be used to accommodate remote access to stored messages for a user. The user may call the voicemail system, which prompts the user to depress one or more keys on the keypad to access messages. In reviewing the messages, the user may depress other keys in order to save, delete, or skip messages. Other uses of DTMF codes include providing automated banking services and automated information services for airline flight arrivals and departures.

DTMF signals must be detected and decoded at the receiving equipment. Particularly if the decoder is front-end circuitry of a voice response unit or a voicemail system, the DTMF signal may be accompanied by voice signals and noise transmitted over the same telecommunications line. Occasionally, the voice signals and/or noise will carry both the high and low frequency components with an amplitude relationship that indicates a DTMF signal. As a result, the detector will pass this spurious DTMF signal to the accompanying decoder for signal processing. A call may be mishandled or inadvertently disconnected.

Various solutions have been proposed to the problems created by interpreting voice and noise signals as valid DTMF signals. U.S. Pat. No. 4,386,239 to Chien describes a multifrequency tone detector in which incoming signals are divided into two separate paths. The first path is dedicated to filtering and processing frequencies within the high group of DTMF frequencies. The second path is dedicated to filtering and processing frequencies within the low group of four DTMF frequencies. For each of the two paths, only the portions of the signals that exceed a given level are considered. A valid DTMF signal will be one in which these high amplitude portions form a pulse train of equally spaced pulses having uniform durations and amplitudes. On the other hand, spurious DTMF noise will include irregularities in both frequency and amplitude, so that the high amplitude portions will produce a pulse train characterized by unequal spaces between pulses and by pulses of unequal durations and amplitudes. A frequency detector and validation circuit rejects signals with such characteristics.

U.S. Pat. No. 5,638,436 to Hamilton et al. asserts that the Chien detector suffers from numerous drawbacks. As one example, the patent contends that if the energy in the voice band is higher than the predetermined level, it may be noisy DTMF tones producing that energy, rather than voice. This will lead to erroneous DTMF detection. The Hamilton et al. patent describes two embodiments of a voice processing system. In both embodiments, the system includes a speech detector and a DTMF detector. The first embodiment automatically disables the DTMF detector if the speech detector perceives voice information on the telecommunications line that is monitored by the system. That is, whenever speech is received the DTMF detector is deactivated so that no tones can be detected, thereby taking advantage of the fact that a user is unlikely to enter DTMF tones while speaking. When the speech is terminated, the DTMF detector is reactivated. In another embodiment, the process is substantially reversed. Upon detecting one of the DTMF tones, further speech detection is prevented. Consequently, false speech detection is minimized. It is this second embodiment that is the claimed invention of Hamilton et al.

A somewhat more sophisticated system is described in U.S. Pat. No. 4,599,495 to Richards. Four average amplitude values are acquired in implementing the detection system. The first value is the average amplitude of frequencies at the lower portion of the voice frequency (VF) band. This lower portion of the VF band may be all frequencies below 800 Hz. The average amplitude is designated as "B." The second average amplitude is determined for all frequencies within the VF band. This average is designated by the letter "T." The third average amplitude is the value for all frequencies within the portion of the VF band containing the four low frequencies for forming DTMF signals. This average is designated as "F1." The final average amplitude is for all frequencies within the portion of the VF band containing the four high frequencies for forming DTMF signals. This average is designated as "F2." An algebraic calculation that is indicative of the difference between F1 and F2 is determined. This calculation is "twist" and is designated by the letter "S." In the next calculation, it is determined whether T−B is equal to or exceeds a first threshold C1 (i.e., is T−B≧C1?). Simultaneously, it is determined whether T−S is equal to or exceeds a second threshold C2 (i.e., is T−S≧C2?). If both of the thresholds are equaled or exceeded, the signal is passed as a valid DTMF signal. On the other hand, if either one of the thresholds is not exceeded, the signal is determined to be a spurious DTMF signal.

While the prior art systems operate well for their intended purpose, further improvements are available. The prior art methods are susceptible to erroneous determinations that result from determining signal measurements for signals that include both the DTMF frequencies and other frequencies. For example, Richards determines the four average amplitudes B, T, F1 and F2. The frequency band for determining B includes the two DTMF frequencies below 800 Hz. The frequency band for determining T includes all of the eight DTMF frequencies. The frequency bands for F1 and F2 each include four of the eight DTMF frequencies. In addition to the DTMF frequencies, the frequency bands for B and T include numerous non-DTMF frequencies.

What is needed is a method and system for distinguishing spurious DTMF noise from valid DTMF signals intended for decoding by processing equipment, with the steps being implemented in a cost efficient and reliable manner.

SUMMARY OF THE INVENTION

A method and system for distinguishing valid DTMF signals from spurious DTMF noise includes detecting signals having a first signal component indicative of a DTMF signal and having a second signal component having frequencies unrelated to DTMF frequencies. The second signal component is analyzed in isolation from the first signal component to determine whether a signal level representative of the second signal component exceeds a predetermined threshold level. Based upon this analysis, the first signal component is designated as being either spurious noise or a valid DTMF signal intended for processing.

The frequencies that are unrelated to DTMF frequencies are defined as those frequencies that are not used to generate DTMF tones. In the preferred embodiment, the signal level that is determined by analyzing the second signal component is an average of the amplitude of the non-DTMF frequencies. If the average amplitude exceeds the predetermined threshold level, the first signal component is suppressed. On the other hand, if the average amplitude is below the predetermined threshold level, the first signal component is forwarded to the decoder of a DTMF-responsive device, such as a voicemail system or a voice response unit.

While not critical, the method preferably includes a confirmation procedure if the signal level falls below the predetermined threshold level, but within a selectable range. The upper limit of the range is the threshold level, while the lower limit is above the anticipated average amplitude of background noise along the signal input line, e.g., a telecommunications line. If the determined signal strength of the second signal component is within the range, a request for a confirmation message is transmitted to the remote device that originally generated the signal that is under analysis. The input line is monitored to detect a confirmation signal transmitted from the remote device as a response to the request for confirmation.

The system includes a DTMF detector that is responsive to incoming signals at an input connected to receive signals from a DTMF signal-generating device. The detector has an output of first signal components having frequency characteristics indicative of DTMF signals. An analyzer is connected to be responsive to the incoming signals and to determine a measured signal level that is representative of amplitudes of non-DTMF frequencies contained within the incoming signal simultaneously with the first signal components. Based upon whether a measured signal level exceeds a predetermined threshold, an associated first signal component is determined to be either spurious DTMF noise or a valid DTMF signal.

DETAILED DESCRIPTION

Figure 1:
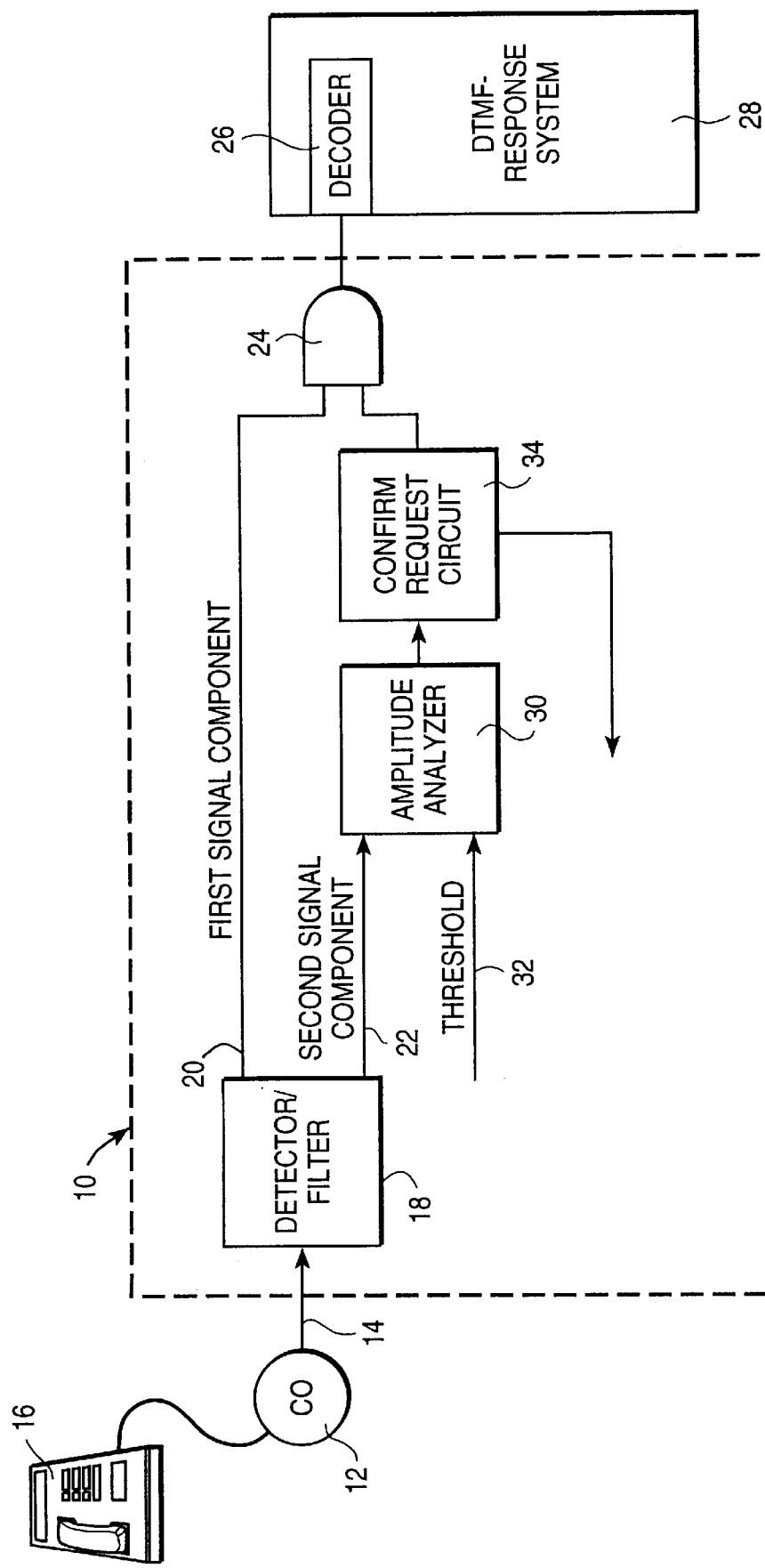
FIG. 1 is a block diagram of a DTMF detection system in accordance with the invention.

With reference to FIG. 1, a system 10 for distinguishing valid DTMF signals from spurious DTMF noise is shown as being connected to a central office 12 of a telecommunications network via a telecommunications line 14. The telecommunications line may be a wired or wireless connection. In FIG. 1, a standard telephone 16 is shown as being connected to the central office. The telephone is capable of generating DTMF signals for detection at the system 10. Other DTMF signal-generating devices may be substituted for the telephone. For example, the DTMF signal-generating device may be a personal computer or a facsimile machine.

The system 10 includes a detector/filter 18 that monitors the telecommunications line 14. While not shown, the telecommunications line is typically also connected to a speech processing device or circuit located at the same site as the system 10. For example, the line may be connected to a conventional telephone. Consequently, the signals that are received at the site of the system may be speech information, DTMF signals, and/or background noise. DTMF detectors are designed to recognize frequency-amplitude combinations that are indicative of valid DTMF signals. A DTMF signal is a direct algebraic summation of one frequency from a high frequency group and one frequency from a low frequency group. In a valid DTMF signal, the higher of the two frequencies within the pair is louder than the lower frequency. This difference is referred to as "twist." When the detector/filter 18 determines that an incoming signal includes the frequency-amplitude combination indicative of DTMF signals, a first signal component is output along output line 20. Preferably, the first signal component includes only the two DTMF frequencies of concern, but this is not critical. In a less preferred embodiment, all of the frequencies are contained within the first signal component. However, a second signal component that is output along a second output line 22 should contain only those frequencies that are not DTMF frequencies of the signal of interest. That is, the DTMF frequencies that were detected by the detector/filter 18 to trigger output of the first signal component along line 20 should be isolated from the second signal component 22. This isolation enhances performance of circuitry for distinguishing valid DTMF signals from spurious DTMF noise.

The circuitry of the detector/filter 18 is not critical to the invention. In one embodiment, the first signal component along output line 20 is formed by passing an incoming signal along telecommunications line 14 through eight sharp-tuned filters, with each filter being dedicated to one of the eight DTMF frequencies. All other frequencies of the incoming signal form the second signal component along output line 22. In another embodiment, the eight sharp-tuned filters are controlled so that only two DTMF frequencies are contained within the first signal component, while the other six DTMF frequencies and all non-DTMF frequencies are contained within the second signal component. Conventional DTMF detector circuitry may be utilized to form the detector/filter of FIG. 1.

Prior systems and methods for distinguishing valid DTMF signals from spurious DTMF noise analyze the high and low group frequencies of potentially valid signals. This analysis may consider only the high and low group frequencies, or may consider these frequencies in combination with all other frequencies. However, the system and method of FIGS. 1 and 2 analyze the second signal component along output line 22 in order to determine the DTMF validity of the first signal component along line 20. The analysis is directly related to signal strength along the second output line 22. A signal is designated as "valid" only if both conditions are met, i.e., detection of the frequency-amplitude combination triggers an output of the first signal component and the analysis of the second signal component indicates a valid DTMF signal. FIG. 1 shows a logical AND circuit 24 that triggers an output to a decoder 26 of a DTMF-responsive system 28 when both conditions are met. The DTMF-responsive system 28 may be a voicemail system or a voice response unit. Alternatively, the system 28 is a fax-on-demand device. The type of system 28 is not critical to the invention.

The second output line 22 from the detector/filter 18 provides an input to an amplitude analyzer 30. The amplitude analyzer determines a signal level that is representative of the second signal component and compares the signal level to a predetermined threshold level that is shown as a threshold input 32. One acceptable algorithm for determining the signal level of the second signal component is an average-finding algorithm. That is, the average amplitude of the second signal component is calculated and compared to the threshold signal level. However, other approaches to determining a relevant signal level of the second signal component may be utilized with satisfactory results.

If the signal level of the second signal component along line 22 is above the threshold level at input 32, the system 10 prevents the first signal component from being forwarded to the decoder 26 of the DTMF-responsive system 28. Normal speech will sometimes generate tones having the frequency-amplitude combinations indicative of DTMF signals. In such a situation, the detector/filter 18 will output a first signal component at line 20. However, the speech will also include a number of frequencies which are not DTMF frequencies. The amplitude analysis that occurs at the analyzer 30 measures the signal strengths of the non-DTMF frequencies and uses the measurement to determine whether the first signal component should be forwarded to the decoder 26.

An optional feature of the system 10 is a confirmation request circuit 34. As will be explained more fully below with reference to FIG. 2, the circuit 34 generates a request message that is transmitted to the source of the incoming signals. In FIG. 1, the source is the telephone 16. While not shown in FIG. 1, the confirmation request message is transmitted via the telecommunications line 14 and the central office 12. The message is triggered if the signal level measured at the analyzer 30 is below the threshold level, but within a preselected range of signal levels. In the preferred embodiment, the message requests a repeat of the DTMF signal of interest. The detector/filter 18 continues to monitor the telecommunications line 14 for a confirmation signal from the telephone 16, allowing the system 10 to repeat the validation process.

There are a number of operational modes of the system 10. In a first mode, the incoming signal along telecommunications line 14 does not include characteristics indicative of an incoming DTMF signal. Consequently, no first signal component is generated along output line 20. In another mode, the detector/filter determines that there is a signal of interest and a first signal component is transmitted to the logical AND circuit 24. While not shown in FIG. 1, a delay may be inserted along the output line 20 to ensure that associated first and second signal components reach the logical AND circuit 24 simultaneously. In the second mode, first and second signal components are output along lines 20 and 22 from the detector/filter 18. If the signal level along the second output 22 exceeds the threshold at input 32, the amplitude analyzer forwards the calculated signal level or the entire second signal component to the confirmation request circuit 34. If the signal level is below the preselected range, the AND circuit 24 passes the DTMF signal to the decoder 26. In another mode, the system 10 triggers a confirmation request message from the circuit 34 and monitors the telecommunications line 14 for the confirmation signal from the telephone 16. The validation process is repeated for the confirmation signal.

Figure 2:
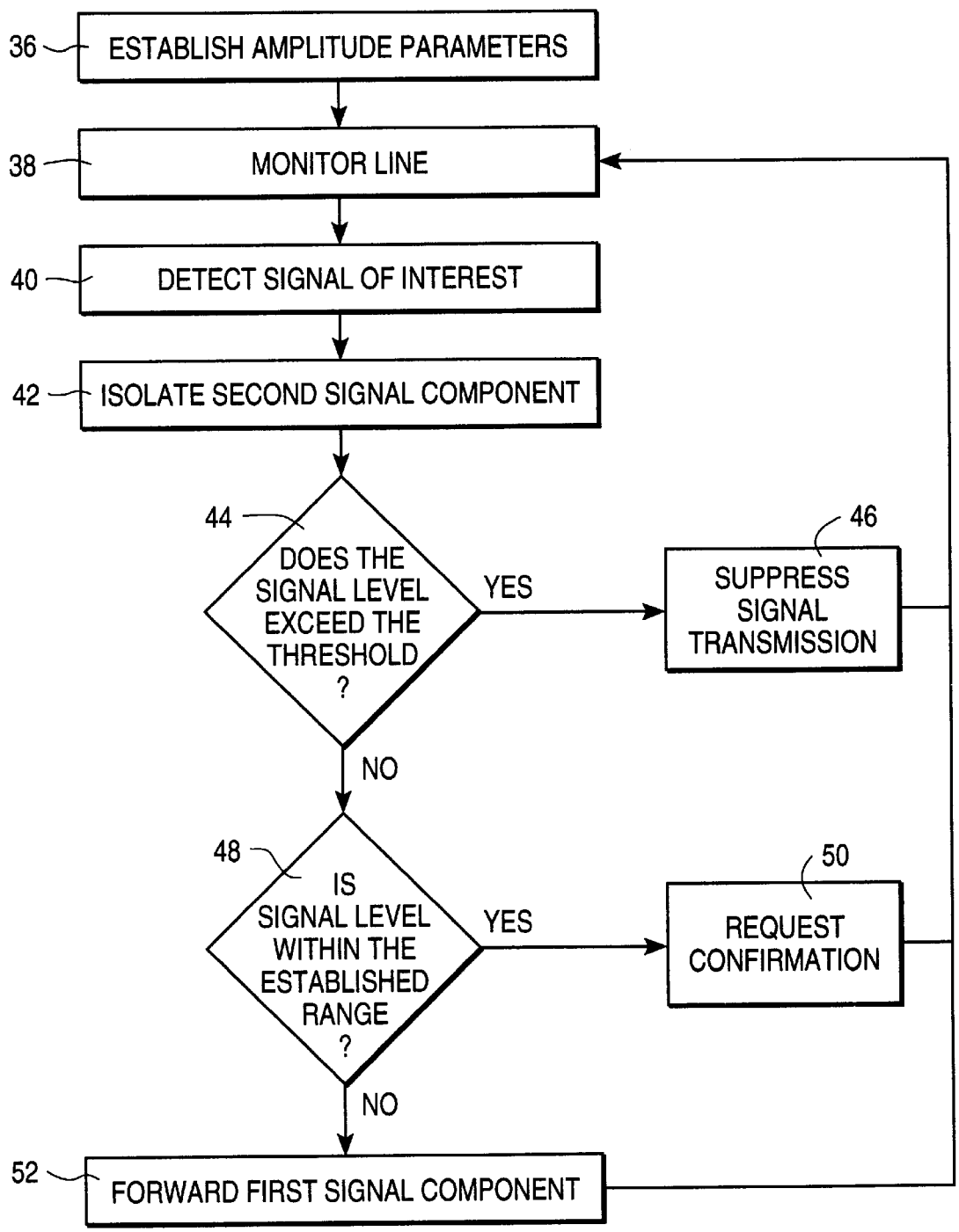
FIG. 2 is a process flow of steps for utilizing the detection system of FIG. 1.

The process steps for the system 10 are shown in FIG. 2. In a first step 36, the amplitude parameters are established. The anticipated level of background noise along the telecommunications line 14 of FIG. 1 should be considered in setting the amplitude threshold for input line 32 of the analyzer 30. If the threshold is set below or near the level of background noise, the system 10 is more susceptible to generating false negative results. A false negative is a determination by the system that a first signal component along output line 20 is spurious DTMF noise, when in fact the first signal component is a valid DTMF signal. The threshold level should also be set according to the sensitivity requirements of the DTMF-responsive system 28. If the primary goal in operating the DTMF-responsive system 28 is to avoid mishandling customer calls as a result of mischaracterization of spurious DTMF noise as valid DTMF signals, the threshold should be set at a level closer to the level of anticipated background noise but sufficiently above the anticipated level of background noise to ensure that the background noise does not block an unacceptable number of valid DTMF signals. On the other hand, if false positives are acceptable in exchange for a higher overall speed in processing customer calls, a relatively high threshold level is preferred.

Optionally, the range for implementation of the confirmation request circuit 34 may be established at step 36 of FIG. 2. The established threshold level may be the upper limit of the range. The lower limit may be set to accommodate individualized requirements of a user. For example, a user of the system 10 may require an implementation having a high rate of call processing and a low error rate of DTMF detection (i.e., few false positives). In such a case, the user may set a high amplitude threshold and establish a confirmation-request range having an upper limit that is the amplitude threshold and a lower limit that is relatively close to the anticipated level of background noise. As a result, the system guards against processing spurious DTMF noise as though it were a valid DTMF signal, but does not disregard signals having a significant potential of being valid. The lower limit of the confirmation-request range defines "significant potential" and affects call handling speed.

In step 38, the telecommunications line 14 is monitored by the detector/filter 18. Upon detection of a signal that includes characteristics indicative of a DTMF signal, the detector/filter 18 generates a first signal component along output line 20. The step of detecting the signal of interest is shown as step 40 in FIG. 2. In step 42, the non-DTMF frequencies are output along line 22 to the amplitude analyzer 30.

A determination is made at step 44 as to whether the signal level measured for the second signal component exceeds the threshold level. An affirmative response leads to the step 46 of suppressing the signal transmission of the associated first signal component. That is, the signal of interest is prevented from passing to the decoder 26 of the DTMF-responsive system 28.

A determination that the signal level calculated for the second signal component does not exceed the predetermined threshold leads to the optional step of determining whether the same signal level is within the pre-established confirmation-request range. This determination is made at step 48. A signal level within the range initiates the step 50 of sending the request for a confirmation message. The message is sent to the telephone or other DTMF-generating device that was the original source of the signal of interest. The message may include an instruction that if no confirmation signal is received within a specified time, the system 10 will assume that the signal is either valid or invalid, depending upon the preference of the user. If the user requires a low error rate, but wishes to minimize the time delays caused by processing confirmation signals, the confirmation request message may include the instruction that the originally received signal of interest will be passed as a valid DTMF signal, unless a contradictory signal is received from the source.

If either response to the determinations at steps 44 and 48 is affirmative, the process executes the appropriate steps 46 and 50, and returns to the step 38 of monitoring the telecommunications line. Alternatively, a negative response at both of the steps 44 and 48 causes the first signal component to be forwarded to the decoder 26 of the DTMF-responsive system 28. This step is shown at 52 in FIG. 2. The process then returns to the monitoring step 38.

Optionally, the step 36 of establishing the amplitude parameters may be automatically and dynamically adjusted on a call-by-call basis. The dynamic adjustment may be dependent upon a caller's responses to confirmation requests. For example, if a connection is particularly noisy, a valid DTMF signal will cause a request for a confirmation message to be triggered at step 50. Once confirmed, the system 10 may automatically adjust the threshold level upwardly in order to reduce the susceptibility of the system to false negative determinations and/or repeated requests for confirmation. Thus, caller frustration is less likely to occur. After the call is completed, the default amplitude parameters are re-established for the next call.

The system and method described above focus upon the amplitude of non-DTMF frequencies of a potential DTMF signal to determine whether the signal is valid or spurious noise. Because spurious DTMF noise will include non-DTMF frequencies with amplitudes substantially higher than amplitudes of non-DTMF frequencies of valid DTMF signals, the amplitude measurements of the second signal component provide a reliable marker to distinguish valid signals from spurious signals. An advantage of the system and method is that a user has the flexibility to establish an amplitude threshold which defines the validation process in a manner that suits the requirements of the user. The same applies to the selection of a confirmation request range.

While the system is shown as being connected to a central office 12, this is not critical. The system 10 and the method of FIG. 2 may be utilized within the central office itself or may be utilized without connection to the central office.

What is claimed is:

1. A method of distinguishing equipment-directed dual tone multifrequency (DTMF) signals intended for processing from spurious DTMF noise comprising steps of:
    monitoring a telecommunications line connected to receive signals from a remote device capable of generating DTMF signals;
    detecting a first signal received via said telecommunications line, said first signal having a first signal component indicative of a DTMF signal and having a second signal component having frequencies unrelated to DTMF frequencies for generating said DTMF signals;
    analyzing said second signal component to a substantial exclusion of said first signal component to determine whether a signal level that is representative of said second signal component exceeds a predetermined threshold level; and
    based upon said analysis of said second signal, designating said first signal as one of spurious DTMF noise or an equipment-directed DTMF signal intended for processing.

2. The method of claim 1 further comprising steps of:
    forwarding said first signal component to one of a voice-mail system and a voice response unit in response to designating said first signal as said equipment-directed DTMF signal; and
    suppressing said first signal component in response to designating said first signal as DTMF noise.

3. The method of claim 1 wherein said step of analyzing said second signal component includes isolating said frequencies unrelated to said DTMF frequencies from said first signal component.

4. The method of claim 3 wherein said step of analyzing said second signal component further includes determining said signal level based upon an average amplitude of said second signal component.

5. The method of claim 4 further comprising a step of transmitting a request to said remote device for confirmation of said first signal in response to determining that said average amplitude of said second signal component is below said predetermined threshold level but within a predetermined range of average amplitudes.

6. The method of claim 5 further comprising a step of monitoring said telecommunications line to detect a confirmation signal transmitted from said remote device as a response to said request for confirmation.

7. The method of claim 1 further comprising a step of selecting said predetermined threshold to be a designation of average amplitude which is greater than average amplitude of background noise inherent to said telecommunications line.

8. The method of claim 1 further comprising a step of isolating said first and second signal components prior to said step of analyzing said second signal component, said step of analyzing including calculating said signal level to be a measure of amplitude.

9. A system for distinguishing spurious DTMF noise from equipment-directed DTMF signals intended for processing, said system comprising:
    a system input to receive incoming signals from a DTMF signal-generating device;
    a DTMF detector connected to be responsive to said incoming signals, said DTMF detector having a first output of first signal components having frequency characteristics indicative of DTMF signals;
    analyzer means, connected to be responsive to said incoming signals, for determining a measured signal level that is representative of amplitudes of non-DTMF frequencies contained in said incoming signal simultaneously with said first signal components; and
    means, responsive to said analyzer means, for inhibiting said first signal component in response to determining that said measured signal level exceeds a predetermined signal level.

10. The system of claim 9 wherein said analyzer means includes circuitry responsive to average amplitudes of said non-DTMF frequencies.

11. The system of claim 9 further comprising one of a voicemail system and a voice response unit in electrical communication with said DTMF detector to receive said first signal component upon determining that said predetermined signal level exceeds said measured signal level.

12. The system of claim 9 further comprising confirmation request means for transmitting a request message to said DTMF signal-generating device in response to detection that said measured signal level is within a range that is below said predetermined signal level, said request message being a request to retransmit a designated first signal component.

13. The system of claim 12 wherein said system input has an anticipated signal level of background noise, said range being above said anticipated signal level.

14. The system of claim 13 wherein said system input is a telecommunications line.

15. A method for distinguishing equipment-directed DTMF signals intended for processing from spurious DTMF noise comprising:

monitoring a line connecting a remote DTMF signal-generating device and one of a central office, a voicemail system, and a voice response unit for the presence of signals including a combination of frequencies characteristic of a DTMF signal;

upon detecting a first signal having said combination of frequencies, isolating said combination of non-DTMF frequencies of said first signal;

analyzing non-DTMF frequencies of said first signal to determine whether an average amplitude of said non-DTMF frequencies exceeds a predetermined amplitude threshold;

based upon said analyzing step, determining whether said first signal is a valid DTMF signal or spurious DTMF noise; and if said first signal is determined to be a valid DTMF signal, transmitting said combination to a decoder of one of said central office, said voicemail system, and said voice response unit.

16. The method of claim 15 further comprising the step of:

if said average amplitude of said non-DTMF frequencies of said first signal is within a predetermined range below said predetermined amplitude threshold, transmitting to a user of said telephone a message requesting confirmation of said first signal.

17. The method of claim 16 further comprising a step of preventing a transmission of said combination to one of said central office, said voicemail system, and said voice response unit if said first signal is determined to be DTMF noise.

18. The method of claim 16 further comprising a step of setting said predetermined threshold at a signal level above an anticipated level of background noise on a telecommunications line to which said DTMF signal-generating device is attached.

19. The method of claim 18 further comprising setting said predetermined range to have an upper limit not exceeding said predetermined threshold and having a lower limit greater than said anticipated level of background noise.

* * * * *